JACK SHUMSKY
INVENTOR

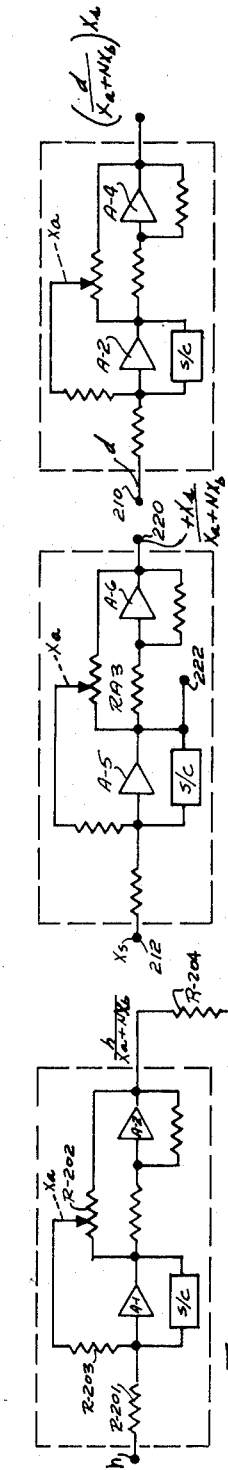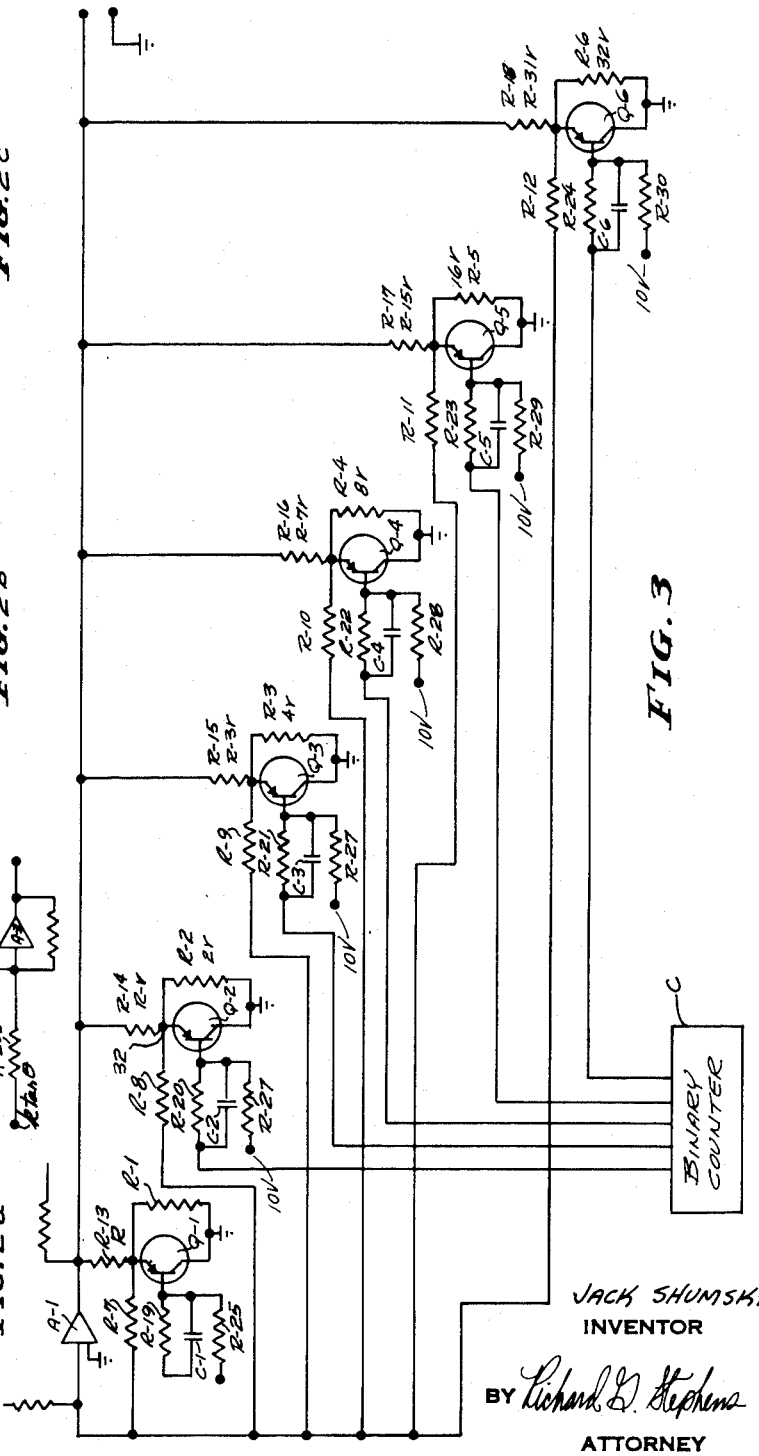

United States Patent Office 3,206,739
Patented Sept. 14, 1965

3,206,739
DISPLAY SYSTEM
Jack Shumsky, Binghamton, N.Y., assignor to General Precision, Inc., Binghamton, N.Y., a corporation of Delaware
Filed Apr. 6, 1962, Ser. No. 185,651
9 Claims. (Cl. 340—347)

This invention relates to an improved visual display system, and more particularly, to improved voltage function generating apparatus for use in providing an abstract visual display. The invention centers around an improvement to visual display systems of the type shown in application Serial No. 20,373, filed April 6, 1960, by John Mailhot for "Abstract Visual Display System," and assigned to the same assignee as the present invention. The Mailhot application, to which reference may be made, illustrates a novel visual display system constructed for use in conjunction with flight simulators. The system includes an arrangement whereby a student pilot seated within the flight simulator views the image on the face of a cathode ray tube (either directly, or alternatively on a screen if a projection type tube is used), and a pattern of dots and lines are produced on the face of the tube to simulate an airport approach as viewed at night, at which time, of course, only the airport approach lights and runway lights are visible. The pattern on the face of the cathode ray tube is controlled by computer means connected to the flight simulator, so that as the pilot's simulated position and simulated attitude change the viewed pattern is changed in size and shape to maintain realistic perspective. Unlike many visual display systems, the Mailhot system requires no film or model or transparency, but instead generates all of the display picture information electronically.

If the face of the cathode ray tube is imagined to be a plane suspended between a pilot and an actual runway, it will be seen that one could trace rays from each runway light toward the pilot's eye, and that the intersection of each ray with the face of the C.R.T. would indicate the position on the C.R.T. face at which a dot of light should appear when the simulated aircraft is "at" the same relative position with respect to an actual runway. The C.R.T. beam is arranged to scan horizontally across the tube along a series of lines which are vertically spaced in accordance with the distance between rows of runway lights, and timing circuitry is arranged to "blank on" the C.R.T. twice during each horizontal sweep to provide dots simulating lights on each side of the runway. Rather than separately computing the position of each light from the simulator instantaneous position and attitude data, the Mailhot system takes advantage of the regular and known spacing of standard approach and runway lights, and operates on an incremental basis, so that after computing the deflection voltages to give the position of one light, the correct C.R.T. deflection voltages necessary to properly locate the other dots of light can be derived by properly adding increments to the first-computed deflection voltages. The proper increments to be added, however, vary in accordance with simulated attitude and position, however, in accordance with the following equations:

$$Y_s = X_s\left(\frac{d}{X_a+NX_b}\right) - X_s\left(\frac{Y_g}{X_a+NX_b}\right) + X_s \tan \psi \quad (1)$$

and $$Z_s = X_s\frac{h}{X_a+NX_b} + X_s \tan \theta \quad (2)$$

wherein:
$Y_s$ is the coordinate of each point on the display screen measured in the runway direction.
$Z_s$ is the coordinate of each point of the display screen measured in a direction transverse to the runway;
$X_s$ is the distance from the pilot's eye to the screen,
$h$ is the altitude of the simulated aircraft above the runway,
$X_a$ is the distance from the simulated aircraft to a reference point on the runway measured along the runway centerline;
$X_b$ is the distance between lights measured along the edge of the runway;
N is the row number of a given light in a progression of successively-displayed lights;
$\theta$ is the simulated aircraft pitch angle,
$d$ is the distance of the simulated aircraft from the centerline of the runway measured perpendicularly to the runway centerline,
$Y_g$ is the distance of the lights from the runway centerline, and
$\Psi$ is the heading angle of the aircraft relative to the runway centerline.

The display system includes position and attitude translator computer means which solves Equations 1 and 2 for successive values of N as successive dots are displayed, providing vertical deflection voltages for the C.R.T. in accordance with Equation 2, and providing controll voltages to horizontal timing circuits, so that the C.R.T. will be unblanked at the correct horizontal positions as the C.R.T. progresses through its scanning raster.

The term $$\frac{X_s}{X_a+NX_b}$$

present in both Equations 1 and 2 may be termed a "staircase" function, as it increases upwardly in discrete increments or steps as N increases, it being understood that N is a digital number. The function differs from usual staircase geometry, however, in that the steps are made in progressively decreasing increments, as will be evident both from a consideration of the term, and from a recognition that rows of lights with a given spacing appear closer together when viewed at a distance than when viewed nearby due to ordinary principles of perspective. The Mailhot apparatus utilized one form of staircase generator to generate the basic staircase function, and several servo-multipliers to provide various terms of the equations required to be solved. By use of the improved staircase generator circuit of the present invention, it becomes economically feasible to provide plural staircase generators and eliminate the costly multipliers required in the Mailhot apparatus.

Because applicant's staircase generating circuits receive a digital number input from an electronic counter and provide an analog output voltage which varies as a function of the digital number, one may characterize the circuit as being one form of digital-to-analog converter. While digital-to-analog converters which provide output voltages directly proportional to applied digital input signals are known in the prior art, they generally have been incapable of providing output voltages which vary inversely with the applied digital input signals, and as will be clear from the preceding explanation, an inverse relation is necessary to provide the proper deflection and timing signals to provide a proper and realistic visual display. Thus it is a primary object of the present invention to provide an improved digital-to-analog converter which will provide an analog output potential inversely commensurate with an applied digital input signal.

Other objects of the invention will in part be obvious and will in part appear hereinafter.

The invention accordingly comprises the features of construction, combinations of elements, and arrangements of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 2a, 2b and 2c are electrical schematic diagrams, partly in block form illustrating certain converter computer circuits of FIG. 1;

FIG. 3 is an electrical schematic diagram illustrating in detail the improved staircase converter of the present invention.

Figure 1:
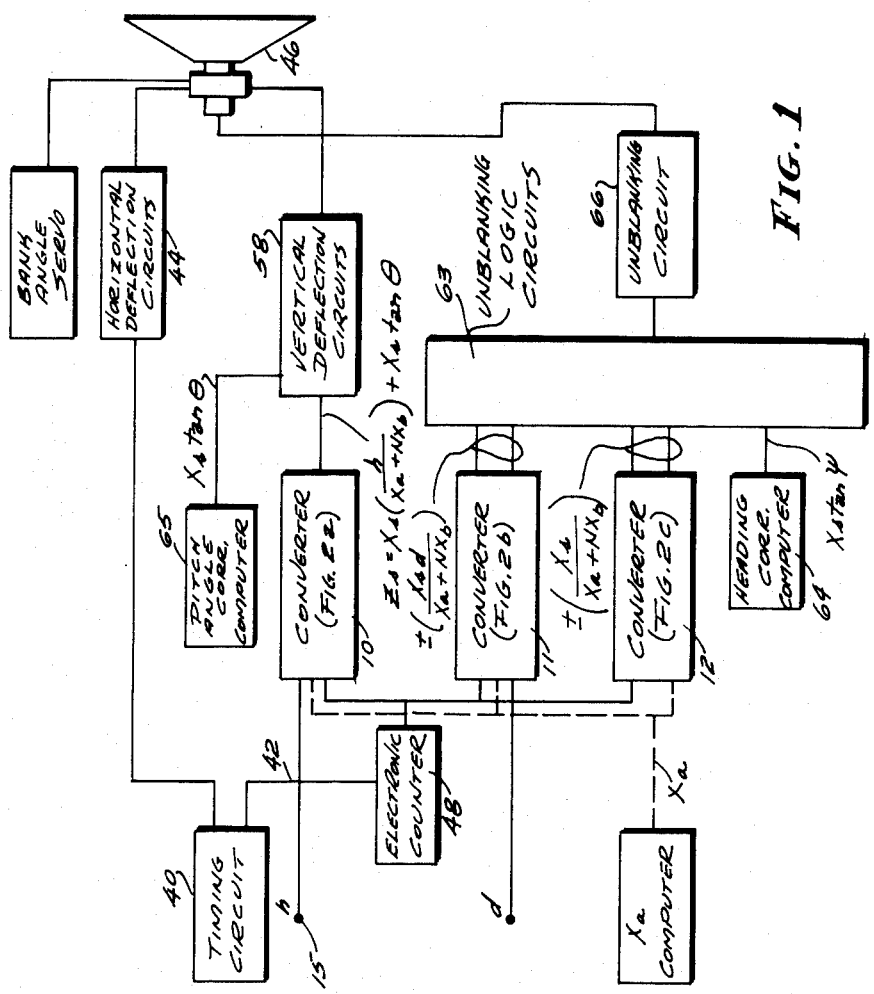
FIG. 1 is a schematic diagram largely in block form illustrating a visual display system constructed in accordance with the present invention.

A block diagram of a visual display system following the teachings of the Mailhot invention but incorporating certain changes in accordance with the present invention is shown in FIG. 1. A basic timing or clock circuit 40 of conventional type provides a series of sawtooth voltages of constant frequency and amplitude via line 41 to conventional horizontal deflection circuits 44 which drive the horizontal deflection coils of the deflection yoke of cathode ray tube 46. Thus it will be seen that the C.R.T. beam will be scanned horizontally across the tube at a constant repetition rate. Timing circuit 40 also provides, in synchronism with the horizontal sawtooth voltages, periodic pulses on line 42 to cycle a conventional electronic binary counter 48, which may be assumed for purposes of explanation to have six stages, which enables the counter to count repeatedly up to binary 111111 (decimal 64) as pulses are applied via line 42. Electronic counter 48 is connected to operate electronic switching circuits in three novel "staircase" converter circuits shown in block form at 10, 11 and 12 and shown in greater detail in FIGS. 2a, 2b, 2c and 3.

Staircase converter 10 is supplied with an input voltage at terminal 15 commensurate with $h$, the instantaneous simulated altitude of the simulated vantage point, and supplied with a further input signal, shown as comprising a shaft input $X_a$ commensurate with the instantaneous distance between the vantage point and a reference point (the first row of lights) on the simulated runway. Staircase converter 10 operates to provide an output voltage which increases in a series of discrete steps, an additional step or increment being generated each time electronic counter 48 registers a count, which occurs once for each horizontal sweep. The output voltage from circuit 10 is applied to the vertical deflection circuits 58 and thence to the vertical deflection coil of the C.R.T. yoke. Thus it will be seen that the C.R.T. beam will be deflected, and if it were not blanked out, to provide a scanning raster comprising 64 horizontal lines (assuming, as above, that counter 48 counts up to 64), with the vertical spacing between the scan lines corresponding to the heights of the steps of the staircase voltage generated by staircase converter 10. As the electron beam is deflected along a given horizontal line, if it is unblanked for two brief instants, two spots of light will appear on the face of the C.R.T., to simulate the two lights on the left and right sides of an airfield runway at a given position along the length of the runway. Thus each horizontal scan is related to a given row of lights. Using a counter and a staircase converter capable of counting up to 64, one may provide a pattern simulating an airfield having as many as 64 rows of lights. Because the angle at which a runway light pattern will be viewed by a pilot depends upon the aircraft pitch angle, a biasing potential $X_s \tan \theta$ is generated by means shown as block 65 to shift the entire C.R.T. presentation upwardly or downwardly as a function of simulated aircraft pitch angle $\theta$.

The instants during any horizontal scan at which the C.R.T. should be unblanked depend upon the instantaneous position of the vantage point with respect to the centerline of the simulated runway, and hence a potential commensurate with $d$, the lateral deviation or displacement of the simulated aircraft from the runway centerline is applied to staircase converter 11 to control certain unblanking logic circuits shown in block form at 63 and shown in detail in the abovereferenced Mailhot application. Because the angle at which a runway light pattern will be viewed by a pilot also depends upon the aircraft heading angle, the unblanking logic circuits are also controlled by an $X_s \tan \psi$ biasing potential generated by means shown at block 64, to shift the entire C.R.T. presentation rightwardly or leftwardly as a function of simulated aircraft heading $\psi$ with respect to the runway direction.

Rather than using three staircase converters as shown in FIG. 1 to derive the required signals to operate the C.R.T. vertical deflection and unblanking systems, the Mailhot apparatus used a single staircase generator to derive the basic staircase function $$\frac{X_s}{X_a + N X_b}$$

and then modified the basic staircase function by means of two separated servo-driven multipliers in accordance with $d$ and $h$. The use of servo-driven potentiometer multipliers, despite their greater expense, was deemed necessary in construction of the Mailhot device due to the great expense and complexity of the staircase generator utilized therein. In accordance with the present invention, staircase generators of a vastly more economical type are provided, so that use of three separate staircase generators and elimination of the servo-multipliers becomes practical.

Equation 2 is solved by apparatus shown partially in block form in FIG. 2a. An input potential $h$ commensurate with simulated altitude above the runway is routed from the flight simulator and applied via input resistor R–201 to the summing junction of operational amplifier A–1, which is provided with two feedback paths, one through potentiometer R–202 and the other through a special digital-analog multiplier or staircase converter SC which is shown in detail in FIG. 3. Amplifier A–1 is provided with high loop gain so as to maintain its summing junction near zero potential, and hence the summation of the three currents applied to the summing junction equal to zero. The current applied to amplifier A–1 is proportional to the amplifier A–1 output $E_1$ (which is inverted in sign by unity gain inverting amplifier A–2) and to $X_a$, the wiper arm position of potentiometer R–202, the arm of which is servo-positioned in accordance with the distance measured along the runway centerline, of the simulated aircraft from the runway, thus providing a current through input resistor R–203 which is proportional to $(k_1 E_1 X_a)$. The current through input resistor R–201 is proportional to $k_2 h$, and the current applied through converter SC is proportional to $E_1$ divided by $Z_{SC}$, the impedance of converter SC. The impedance $Z_{SC}$ of converter SC is equal, as will be explained below, to $1/N X_b$.

Setting the three summed currents equal to zero:

$$k_2 h + k_1 E_1 X_a + E_1 N X_b = 0$$

or $$E_1 = \frac{-k_2 h}{k_1 K_a + N X_b}$$

After inversion by amplifier A–2, the output signal applied via resistor R–204 to summing amplifier A–3 will be seen to be proportional to $$\frac{+h}{V_a + N X_b}$$

A tangent-function potentiometer (not shown) driven by the simulator pitch angle servo derives the $k_4 \tan \theta$ input voltage which is applied via scaling resistor R-205, and thus it will be seen that the output signal from amplifier A-3 is that required for solution of Equation 2. In similar manner, a $d$ voltage commensurate with the lateral deviation of the simulated aircraft from the runway centerline is applied to terminal 210 in FIG. 2b to provide an output voltage proportional to $$\frac{d}{X_a + NX_b}$$

and a constant voltage $X_s$ is applied via terminal 212 to provide voltages proportional to $$\frac{X_s}{X_a + NX_b}$$

and the inverse thereof, from terminals 220, 222.

The staircase generator SC, as shown in FIG. 3, comprises a multi-path feedback network connected between the output and input terminals of operational amplifier A-1, a conventional direct-coupled high "open-loop-gain," inverting amplifier. The converter includes a plurality of switching transistors Q-1 through Q-6, all of which are shown having their emitter terminals connected to the output line of amplifier A-1, and the base electrode of each transistor is connected to a respective stage of a parallel binary counter C. It will be apparent that a different number of transistors and a binary counter having such different number of stages may be utilized without departing from the invention, only six being shown solely for the sale of clarity. Because the multi-path network receives an analog signal from the output terminal of amplifier A-1 and a digital signal from counter C provides a feedback voltage commensurate with their product to amplifier A-1, the network will be seen to perform the function of a digital-analog multiplier.

In FIG. 3 each feedback path shown includes a voltage divider consisting of a pair of series-connected resistances connected between the amplifier output terminal and ground, with a third resistance connected between the junction between the two resistances and the amplifier A-1 summing junction. For example, resistors R-13 and R-1 are connected in series to ground, and the junction between them connected via resistor R-7 to the amplifier summing junction. Each of the resistors connected to ground will be seen to be shunted by a respective one of the mentioned transistors. The transistor bases are driven by parallel binary signals from counter C, with $2^6$ or 64 different values of feedback current being possible in the six digit embodiment shown. By operating the transistors in the grounded collector configuration shown, very small voltage drops exist across conducting transistors, making them effective switches to short out the respective resistors with which they are connected in parallel. It should be noted that while the amplifier output voltage may be either positive or negative, the transistor switches may be switched on and off by the voltages from the counter irrespective of polarity, by making the base drive voltages much larger than the maximum emitter voltages during maximum amplifier output. This may be done easily without the use of large base drive voltages, because the voltages across the transistors are, due to the voltage divider circuits shown, always a very small fraction of the amplifier output voltage. Also, it is an important feature of the invention, that because only a small fraction of the amplifier output voltage appears across the transistors, the transistors utilized need not have high voltage ratings. While PNP transistors are shown, those skilled in the art will recognize that NPN transistors may be substituted with appropriate change in base drive polarity. Also, it should be noted, that symmetrical switching transistors may be substituted, and even grounded emitter transistors may be used if an adequate base drive voltage source is available, without departing from the invention.

When any of the transistor switches are conducting, they effectively short their respective input resistor (of the group R-7 through R-12) to ground, applying no feedback current to the amplifier summing junction. Negative voltages of 10 volts are provided from each stage of counter C to cutoff the various transistors when their respective binary digits are "1." When a +10 volts signal is applied from stage 1 of counter C via resistor R-19 to the base of transistor Q-1, this transistor will be cut off, allowing the voltage at terminal 31 to rise from zero volts to $$\frac{ArR_0}{\dfrac{r+R_0}{R+\dfrac{rR_0}{r+R_0}}}$$

which may be taken with negligible error (because $R_0$ is much greater than $r$ and the amplifier gain is high) to equal $$\frac{Ar}{R+r}$$

thereby applying a feedback current through R-7 commensurate with $$\frac{Ar}{R_0(R+r)}$$

where A is the amplifier output voltage. Similarly, when transistor Q-2 is cut off, the voltage at terminal 32 rises to substantially $$\frac{2Ar}{R+r}$$

thereby applying a feedback current through R-8 commensurate with $$\frac{2Ar}{R_0(R+r)}$$

It will be seen that the emitters of the six switching transistors are connected to ground through resistors arranged in a binary progression, with resistor R-2 having twice the resistance of R-1, etc., so that binary-increasing feedback currents are applied to amplifier A-1. The total feedback current applied to the amplifier junction through all of the transistor switching circuits will be seen to be expressable as follows:

$$i_{f.b.t.} = \frac{A}{R_0(R+r)}(A_0 r + A_1 2r + A_2 4r + \;-\;-\;-\; A_{n-1} 2^{n-1} r + A_n 2^n r)$$

where $A_0, A_1, A_2 \;-\;-\;-\; A_n$ may be either "1" or "0." Inverting the expression for current and multiplying by voltage A, one may readily see that the impedance $B_{sc}$ of the electronically switched feedback network varies inversely in accordance with the binary number present in electronic counter C as required.

While the staircase converter is shown utilized in applications requiring an output which varies inversely in accordance with the sum of two terms, so that two feedback paths are provided, it should be recognized that the invention also may be used in other applications requiring an output inversely proportional to a single digial number. Furthermore, while FIG. 3 illustrates a converter in which the resistances of the feedback path are scaled in a binary progression, it is clearly within the scope of the invention to construct converters having the voltage dividers of the electronically-switched feedback network scaled in accordance with desired functions of a binary progression, to provide staircase outputs which vary inversely with the selected functions.

It will thus be seen that the objects set forth above, among those made apparent from the preceding description, are efficiently attained, and since certain changes may be made in the above construction without depart- Having described my invention, what I claim as new and desire to secure by Letters Patent is:

1. A digital-to-analog converter capable of providing an analog output voltage which varies inversely with an applied parallel digital input signal, comprising, in combination: a high-gain direct-coupled operational amplifier having an input summing junction and an output terminal; means for applying an analog input potential to said input summing junction of said amplifier; and a variable impedance network having a first plurality of conductors connected to said output terminal of said amplifier, a like plurality of second conductors connected to said input summing junction, a like plurality of control conductors connected to receive said applied parallel digital input signal, and a like plurality of transistors, each of said conductors of said first plurality being connected through an individual pair of resistances connected in series to a point of reference potential, the emitter-collector circuit of each of said transistors being connected between the junction between a respective pair of said resistances and said point of reference potential, an individual summing resistor connected between each of said junctions and a respective one of said second conductors, and circuit means for connecting said control conductors to respective base electrodes of said transistors.

2. A digital-to-analog converter for providing an output voltage inversely commensurate with the value of a parallel digital input signal, comprising, in combination: a high-gain direct-coupled operational amplifier having an input summing junction and an output circuit; means for applying an input potential to said summing junction; and a variable impedance feedback network connected between said output circuit and said summing junction; said feedback network comprising a plurality of voltage dividers connected to said output circuit to be excited in accordance with said output voltage, each of said voltage dividers comprising first and second resistances connected in series, a plurality of transistors connected to respective of said voltage dividers, the collector-emitter circuit of each of said transistors being connected in parallel with a respective one of said second resistances, a plurality of further resistances connected from between the first and second resistances of respective voltage dividers to said summing junction, and circuit means connecting said parallel digital signal to the base electrodes of said transistors.

3. Apparatus according to claim 2 having a further feedback resistance connected between said output circuit and said summing junction.

4. A digital-to-analog converter for providing an analog output potential inversely commensurate with an applied digital input signal, comprising, in combination: a high-gain direct-coupled operational amplifier having an input summing junction and an output terminal; first and second feedback networks; means connecting said first and second feedback networks between said output terminal and said input summing junction; said first feedback network including at least a resistor; and said second feedback network including at least a further resistor and circuit means responsive to said applied digital input signal for adjusting the magnitude of said at least further resistor in accordance with the value of said digital input signal, said means including a plurality of voltage dividers connected to said amplifier output terminal, each of said plurality of voltage dividers comprising first and second resistances connected in series; a plurality of transistors each connected to a respective one of said plurality of voltage dividers, the collector-emitter circuit of each of said plurality of transistors being connected in parallel with a respective one of said second resistances; a plurality of further resistances connected between said first and second resistances of said plurality of voltage dividers and said amplifier input summing junction; and circuit means coupling said applied digital signal, parallel bit by bit, to the base electrodes of all of said plurality of transistors.

5. The converter of claim 4 wherein each of said second resistances are arranged in a binary progression in order that binary-increasing feedback currents are applied to said amplifier summing junction in accordance with the value of said input digital signal.

6. The converter of claim 4 wherein each of said plurality of transistors is rendered conductive by the respective bit of said applied digital signal to by-pass the associated one of said second resistances.

7. An electronic circuit comprising, in combination: a high-gain direct-coupled operational amplifier having an input summing junction and an output terminal; first and second feedback paths; means coupling said first and second feedback paths between said amplifier output terminal and said input summing junction; said first feedback path including at least a potentiometer adjustable in accordance with a desired function; said second feedback path including a staircase converter comprising a multi-path network having a plurality of switching transistors, the emitter electrode of each of said plurality of transistors being connected to said amplifier output terminal and the base electrode of each of said plurality of transistors being connected to a respective stage of an associated parallel binary counter, and voltage divider means coupling said emitter electrodes of all of said plurality of transistors to said amplifier input summing junction; a timing circuit operable to provide a sequence of pulses; and means coupling said pulses to said parallel binary counter.

8. The circuit of claim 7 wherein each of said voltage divider means includes first, second, and third resistors; and means coupling said first resistor between said amplifier output terminal and the emitter electrode of a respective transistor, said second resistor between the emitter electrode of said respective transistor and a reference potential, and said third resistor and said amplifier input summing junction.

9. The circuit of claim 8 wherein each of said second resistors of each of said voltage dividers are selected to have a binary value in accordance with the significance of the respective stage of said parallel binary counter with which it is associated.

References Cited by the Examiner

UNITED STATES PATENTS

| | | | |
|---|---|---|---|
| 3,019,426 | 1/62 | Gilbert | 340—347 |
| 3,044,007 | 7/62 | Akers | 340—347 |
| 3,051,938 | 8/62 | Levy | 340—347 |
| 3,058,662 | 10/62 | Whitesell | 235—194 |
| 3,092,824 | 6/63 | Bentley et al. | 340—347 |

MALCOLM A. MORRISON, *Primary Examiner.*